United States Patent
Schaefer

(10) Patent No.: US 8,195,326 B2
(45) Date of Patent: Jun. 5, 2012

(54) PICKING STATION AND METHOD FOR PICKING WITH A LIGHT GRID

(75) Inventor: Gerhard Schaefer, Neunkirchen (DE)

(73) Assignee: SSI Schaefer Peem GmbH, Graz (AT)

( * ) Notice: Subject to any disclaimer, the term of this patent is extended or adjusted under 35 U.S.C. 154(b) by 756 days.

(21) Appl. No.: 11/371,236

(22) Filed: Mar. 9, 2006

(65) Prior Publication Data

US 2006/0216138 A1   Sep. 28, 2006

Related U.S. Application Data

(63) Continuation of application No. PCT/EP2005/000204, filed on Jan. 12, 2005.

(30) Foreign Application Priority Data

Jan. 13, 2004  (DE) .......................... 10 2004 002 831

(51) Int. Cl.
G06F 7/00 (2006.01)

(52) U.S. Cl. .......................................... 700/216; 186/55

(58) Field of Classification Search .................. 700/216, 700/214, 217, 219–221, 223–226, 228–230; 194/349, 351; 186/24, 33, 55–58, 69; 307/326; 361/1; 414/266, 267, 269–271, 275

See application file for complete search history.

(56) References Cited

U.S. PATENT DOCUMENTS

| | | | | |
|---|---|---|---|---|
| 5,243,183 A * | 9/1993 | Barron et al. | ............... | 250/222.1 |
| 5,395,206 A * | 3/1995 | Cerny, Jr. | ............... | 414/807 |
| 5,781,443 A * | 7/1998 | Street et al. | ............... | 700/214 |
| 6,011,998 A * | 1/2000 | Lichti et al. | ............... | 700/230 |
| 6,179,704 B1 * | 1/2001 | Suzuki | ............... | 453/63 |
| 6,275,152 B1 | 8/2001 | Speas et al. | | |
| 6,377,867 B1 * | 4/2002 | Bradley et al. | ............... | 700/216 |
| 6,650,225 B2 * | 11/2003 | Bastian et al. | ............... | 340/5.92 |
| 6,732,014 B2 * | 5/2004 | Whitten et al. | ............... | 700/244 |
| 7,062,893 B2 * | 6/2006 | Lawton et al. | ............... | 53/564 |
| 7,110,855 B2 * | 9/2006 | Leishman | ............... | 700/216 |
| 2002/0070846 A1 * | 6/2002 | Bastian et al. | ............... | 340/5.92 |
| 2002/0140567 A1 * | 10/2002 | Crawley et al. | ............... | 340/686.2 |
| 2002/0175606 A1 | 11/2002 | Holmes | | |
| 2004/0197171 A1 | 10/2004 | Freudelsperger | | |
| 2004/0243278 A1 * | 12/2004 | Leishman | ............... | 700/214 |
| 2005/0098626 A1 * | 5/2005 | Jordan et al. | ............... | 235/381 |
| 2007/0219665 A1 * | 9/2007 | Whitten et al. | ............... | 700/244 |

FOREIGN PATENT DOCUMENTS

| | | |
|---|---|---|
| DE | 298 06 960 U1 | 9/1998 |
| DE | 199 04 775 A1 | 8/2000 |
| DE | 101 36 354 A1 | 2/2003 |

* cited by examiner

Primary Examiner — Jeffrey Shapiro
(74) Attorney, Agent, or Firm — McNeely, Hare & War, LLP; Kevin J. McNeely

(57) ABSTRACT

The invention relates to a commissioning area (10) comprising a buffer (12) for order containers (14) in which items can be commissioned, said buffer (12) comprising a plurality of adjacent buffer regions for respectively receiving an order container (14). According to the invention, a beam field (16) is provided above the buffer (12) in order to monitor the commissioning of items (28).

18 Claims, 5 Drawing Sheets

PICKING STATION AND METHOD FOR PICKING WITH A LIGHT GRID

RELATED APPLICATIONS

This is a continuation application of co-pending international patent application PCT/EP2005/000204 (WO 2005/068327 A1) filed Jan. 12, 2005 which claims priority of the German application DE 10 2004 002 831.1 filed on Jan. 13, 2004, which is fully incorporated by reference herewith.

BACKGROUND OF THE INVENTION

The present invention relates to a order-picking station having a order container buffer, wherein articles are pickable into the order containers, the buffer including one or more buffer spaces, particularly being arranged next to each other, for respectively receiving one order container.

The present invention further relates to a method for order-picking articles into order containers at a picking station, the order containers being storable within an order container buffer.

RELATED PRIOR ART

Such a method and system are generally known in the prior art.

For example, the document DE 101 36 354 A1 discloses a picking method and a picking system having a container storage and an associated storage and retrieval device for storing and retrieving storage containers. Goods to be picked are located within the storage containers. The goods to be picked can be of any type of articles storable in such a container storage.

The term "container" is not intended to be limited but rather is an example for a plurality of possible storage units such as trays, palettes and the like. The term "articles" is to be understood as items which can be stored in a container storage and storage containers, respectively. Articles, for example, can be medicaments, tool pieces or the like, which are ordered, e.g. by customers in arbitrary quantities and numbers. Then, the different ordered articles are concatenated as a so-called order, wherein the articles of the order, as a rule, are picked into one or, should the occasion arise, several order containers, the order containers subsequently delivered to the customer.

A picking station in a picking system is to be understood as a location, where a picking person takes out articles, which are stored within the storage containers, in order to deposit them subsequently into order containers, which are provided.

An "order container" is to be understood as a container into which goods and articles, respectively, are put, which are to be picked. An order container can receive a plurality of different articles until the order associated therewith is processed, i.e. until all articles which belong to that order are retrieved from the storage towards the picking station and have been deposited into the corresponding order container by the picking person.

Recently, it has gone over to design the picking process according to the "goods-to-man" principle. According to the "goods-to-man" principle a fixed working area is assigned to the picking person from which he/she moves away as less and seldom as possible. The articles to be picked are conveyed in storage containers to the picking person. This increases the efficiency of the entire system and fulfills the high ergonomic requirements which, nowadays, become more and more the focus of attention.

The storage containers are conveyed to the picking stations by means of a corresponding conveyor system. The order containers are "parked" at the picking station directly in front of the picking person. They are just parked in a so-called order container buffer which can receive a plurality of order containers. The order container buffer is also connected with one, and if necessary, with further conveyor systems which convey empty order containers to the picking station and completely picked order containers away from the picking station in reaction to a signal. That is why according to the prior art, for example, a push button is provided at the picking station by which the picking person can confirm a terminated picking process. Thus, the picking person, for example, takes out an article from a storage container and puts this article taken into a corresponding order container. After the deposition of the article into the order container, the picking person can actuate the button in order to confirm the picking process. A superordinated host system detects this signal and subsequently judges whether or not the order is completely processed. If the order container is completely picked, then the order container can be conveyed off.

This procedure involves several disadvantages. On the one hand, the order containers are conveyed out of the order container buffer which possibly are not to be transported off yet. This is particularly the case, when the picking person actuates the button inadvertently although he/she has not deposited the article to be picked into the corresponding order container. On the other hand, the button could be actuated although an insufficient number of articles has been put into the order container so that the order is signaled to the host system as being completely processed although this is not the case.

Further, there is a significant risk of injury. For increasing the velocity of the picking process it is possible that the picking person puts the article to be picked into the order container with the one hand while he/she confirms the picking process with the other hand. This can result in that the picking person has one of his/her hands within the order container to be picked while simultaneously the conveyance of this order container is initiated by the host system. Then the order container could be moved from the order container buffer which possibly may result in an injury of the picking person since he/she still has one of his/her hands within that order container.

SUMMARY OF THE INVENTION

Therefore, it is an object of the present invention to provide a picking station as well as a picking method meeting the increased safety requirements with respect to both the physical integrity and avoidance of picking errors.

This object is achieved by a picking station as mentioned at the outset wherein a beam field is provided above the buffer in order to monitor the picking of articles.

This object is further achieved by a picking method as mentioned at the outset, wherein a beam field is generated above the buffer, an interruption signal is detected which is generated through the interruption of beams of the beam field, and a first enabling system is output which allows the conveyance of an order container from the buffer.

By providing a beam field above, and particularly directly above, the order container buffer each picking process can be monitored in two ways. On the one hand, it can be monitored if the picking person still has one or, should the occasion arise, both of his/her hands within the order container while the conveyance of this order container has already begun. On the other hand, it can be monitored if a number of articles to be picked according to a picking order has been put into the corresponding order container.

In both instances the beam field is either interrupted by the articles and/or the hands. This interruption can be used for determining whether the picking person has taken out the hands from the order container. When the hands are taken out, the beam field is not interrupted any longer. Thus, the order container can be conveyed out of the order container buffer, if necessary. On the other hand, it can be checked based on the number of interruptions, which are caused by throwing in or putting in the articles, if the corresponding number of articles to be picked has been deposited in the corresponding order container.

The risk that the picking person gets injured is significantly reduced. The removal of the order containers is no longer possible while the picking person still has his/her hands within the order container. Also, a premature removal of the order containers, without the desired number of articles being put into the right order container according to the picking order, can be prevented since the number of the articles which are put into the order container can be determined through the number of interruptions of the beam field.

In accordance with a preferred embodiment, the beam field is arranged, particularly directly, above the openings of the order containers.

The closer the beam field is arranged above the openings of the order containers the easier the location can be reconstructed at which the beam field has been interrupted by a passage of a hand and/or an article, and with the knowledge of the locations of the beam field relative to the order containers, which are located within the buffer, an order container can be assigned. On the other hand, an improved temporal assignment is possible since the way, which an article being put through the beam field has to pass from the beam field to the bottom of the order container, is shorter.

It is particularly preferred if the beam field includes a plurality of pairs of transmitters and receivers for transmitting beams and receiving the transmitted beams.

The more beams are forming the beam field, the better the location of the interruption of beam can be localized and reconstructed, respectively. The number of transmitter and receiver pairs and its distance to each other is directly correlated with the spatial resolution. The spatial resolution can be used for assigning an article interrupting the beam field to an order container which is located within the order container buffer.

It is particularly preferred if the transmitter and receiver pairs are arranged within a strip.

A strip having pairs of transmitters and receivers can be installed above the order container buffer in an easy manner. An adjustment necessary during the installation of a beam field can be reduced to an adjustment of two units, namely the strips which contain the pairs of transmitters and receivers, instead that the transmitters and receivers, respectively, of each transmitter and receiver pair have to be adjusted separately with respect to each other.

Further, it is preferred if transmitters of the transmitter and receiver pairs and receivers of the transmitter and receiver pairs are arranged on a second strip such that a beam field of beams, being particularly parallel, can be generated between the first and second strip.

By this measure the adjustment of the beam field above the order container buffer is facilitated.

Additionally, it is an advantage, if transmitters and receivers of the transmitter and receiver pairs are arranged alternately on one and the same strip in order to generate with a further strip, which is equally formed, a crossed beam field.

A crossed beam field has the advantage, in comparison to a beam field being formed of parallel beams, that also the space between the otherwise parallel beams can be monitored. In dependence on the angle between the crossing beams the monitoring location, i.e. the location where the beams cross, can be varied. This is particularly the case if the beam field is formed by two oppositely arranged strips.

According to a further preferred embodiment, the beam field can be coupled to means for detecting and evaluating a signal which is generated if an article to be picked or a part of the picking person's body interrupts a beam of the beam field.

Such means for detecting and evaluating a signal can be a microcomputer which, for example, is coupled directly to the electronics of the beam field in order to directly evaluate the received signals. This measure relieves the computer, which is responsible for the monitoring of the entire system, by removing processing load therefrom.

Further it is preferred, if the means for detecting and evaluating can determine the location of the interruption in order to be able to assign the article, which generates the signal, to an order container.

In this manner, it can be directly determined whether the picking person has put the article, which is to be picked, into the right order container within the order container buffer. If necessary, the means for detecting and evaluating can be coupled directly to the computer monitoring the entire system in order to output a corresponding fault message. However, the means can also directly cause the output of a signal, which notifies to the picking person that the concurrent picking process is or was erroneous. The picking person can thus correct the error directly, i.e. at place. The otherwise erroneous picked order container thus does not need to be re-picked for repair of error, i.e. it does not need to be brought into the entire course of the system again, thereby increasing the entire efficiency of the picking system significantly.

It has proved advantageously if the transmitter and receiver pairs generate infrared beams or visible light.

Infrared light and visible light, respectively, is harmless to the eyes of the picking person and thus corresponds to the safety regulations of today.

It is particularly preferred if the beam field is formed by at least two orthogonal transmitter and receiver pairs.

Provision of transmitter and receiver pairs which are orthogonal with respect to each other increases the already above-mentioned spatial resolution to a specific degree since a second dimension can be introduced. Hence, not only an x-component, but also an y-component of a two-dimensional Cartesian beam field can be monitored.

According to a preferred embodiment of the method of the present invention a first enabling signal is output when the beams are no longer interrupted.

The interruption of the beams of the field of beams corresponds, under certain circumstances, to that state at which the picking person has one of his/her hands within the order container of the order container buffer. As long as the signal is interrupted, no enabling signal can and will be output which could release the retrieval of the order container. The danger of the picking person becoming injured, due to a retrieval of an order container within which the picking person has his/her hands, in practice is reduced to zero.

Further, it is preferred if the first enabling signal is output when the order container is completely picked.

According to another preferred embodiment, a second enabling signal is output when the order container is not completely picked such that further articles, which are to be picked, can be delivered to the picking station.

It goes without saying that the features mentioned above as well as those which are still to be explained in the following text can be used not only in the respectively stated combination but also in other combinations or on their own, without departing from the scope of the present invention.

Exemplary embodiments of the invention are illustrated in the drawing, and will be explained in more detail in the following description. In the drawings:

DESCRIPTION OF PREFERRED EMBODIMENTS

Figure 1:
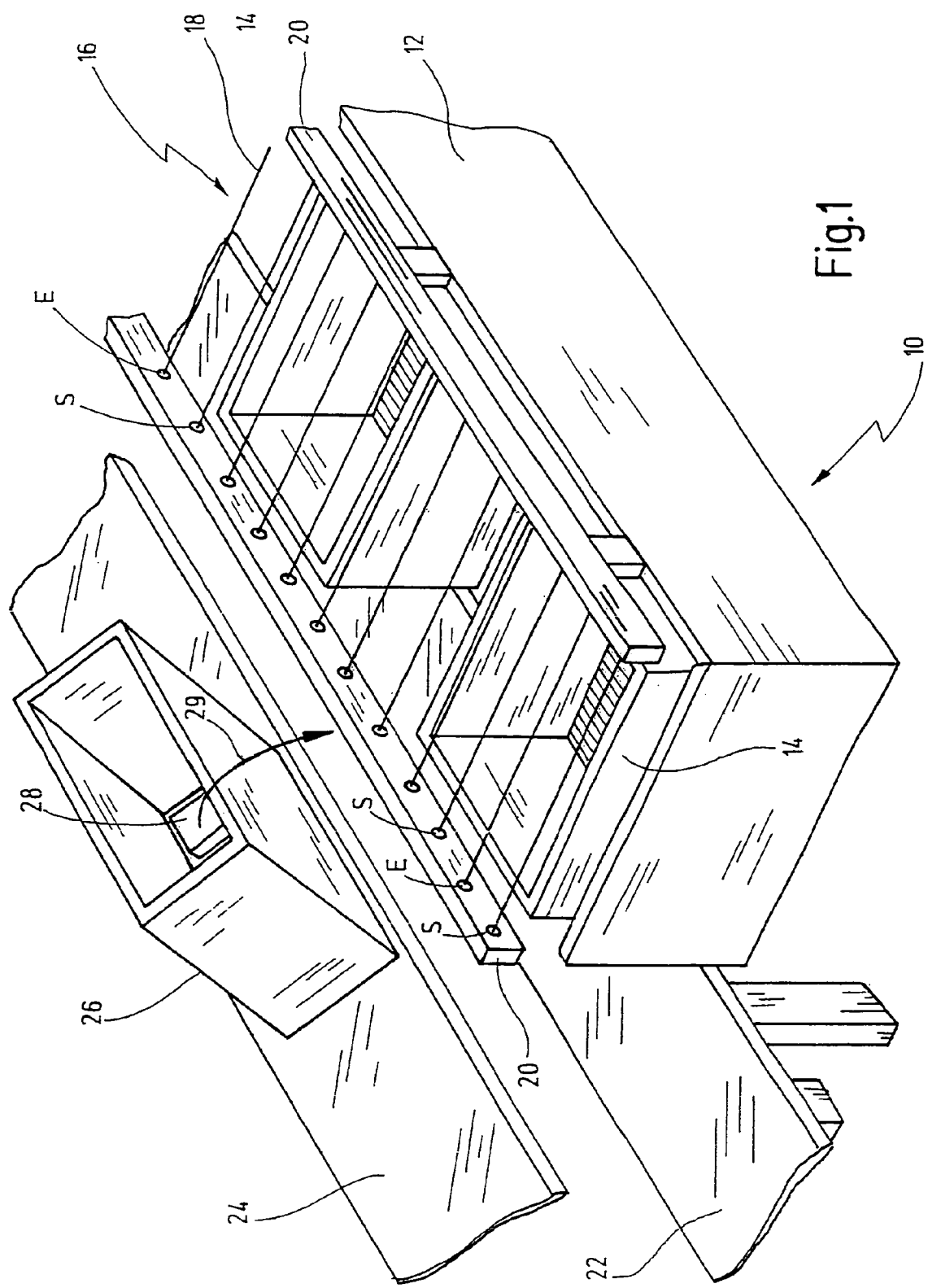
FIG. 1 is a schematic perspective view of a picking station according to the present invention.

A picking station according to the invention is hereinafter generally designated by reference numeral 10.

In FIG. 1, a schematic perspective view of a picking station 10 according to the present invention is shown. The picking station 10 includes a buffer 12 intended for order containers 14. Above the buffer 12 intended for the order containers 14 a beam field 16 is arranged which includes a plurality of beams 18. The beams 18 are transmitted by transmitters T and received by receivers R.

A transmitter T and receiver R form a so-called transmitter and receiver pair. Both, the transmitter T and the receiver R can be attached to or located within strips 20. However, they can also be provided individually.

In the example shown in FIG. 1, the transmitters T and receivers R are alternately attached to the strips 20 having an equal distance with respect to each other such that the beam field 16 is formed by parallel beams 18. The distance between the transmitters T and receivers R on a strip 20 can be chosen arbitrarily.

The less the distance of the transmitters T and receivers R is, the more transmitters T and receivers R have to be provided per fixed length of the strip 20, and, also, the higher the possible spatial resolution will become.

Alternatively, merely transmitters T can be provided on one of the strips 20, wherein only receivers R will then be provided on the opposite strip 20. The beam field 16 does not absolutely have to be formed by parallel beams 18. It can also be formed by beams being arbitrarily orientated to each other, which are respectively assigned to a transmitter and receiver pair.

Further, FIG. 1 shows a conveyor system 22 such as a roller track (not shown) or a conveyor belt by which empty order containers 14 can be conveyed to the buffer 12 and picked order containers 14 can be retrieved from the buffer 12.

Even further, a further conveyor system 24 can be provided which conveys the storage container 26 from a container storage, which is not depicted in FIG. 1, to the picking station 10. The storage containers 26 contain articles 28 which are to be picked. For this purpose, a picking person, being not illustrated, takes out the articles 28 from the storage container 26 and puts these into assigned order containers 14 provided. Such a picking process is schematically depicted by an arrow 29.

In order to enable the putting of the article 28 from the storage container 26 into the order container 14, the picking person must traverse the beam field 16 at least with the article 28 which is to be picked. If the articles are highly fragile the picking person, as a rule, will manually put the fragile article 28 into the order container 14. At the same time, he/she grabs through the beam field 16 with his/her hand.

Thus, at least one of the beams 18 of the beam field 16, as a general rule, is interrupted either by a thrown-in article 28, or by a hand or an arm of the picking person. As long as the beam 18 is interrupted, it is obvious that either an article 28 is just given into an order container 14, or an arm or a hand grabs through the beam field 16.

As will be discussed with reference to FIG. 2, one or more strips 20 can be connected to means 30 for detecting and evaluating interruption signals. The strips 20 can have the means 30 integrated. By the means 30 the interruption of a beam 18 can be detected. Signals which will be discussed below can be output in dependence thereon. Also, the location of the interruption can be determined by the means 30.

Figure 2:
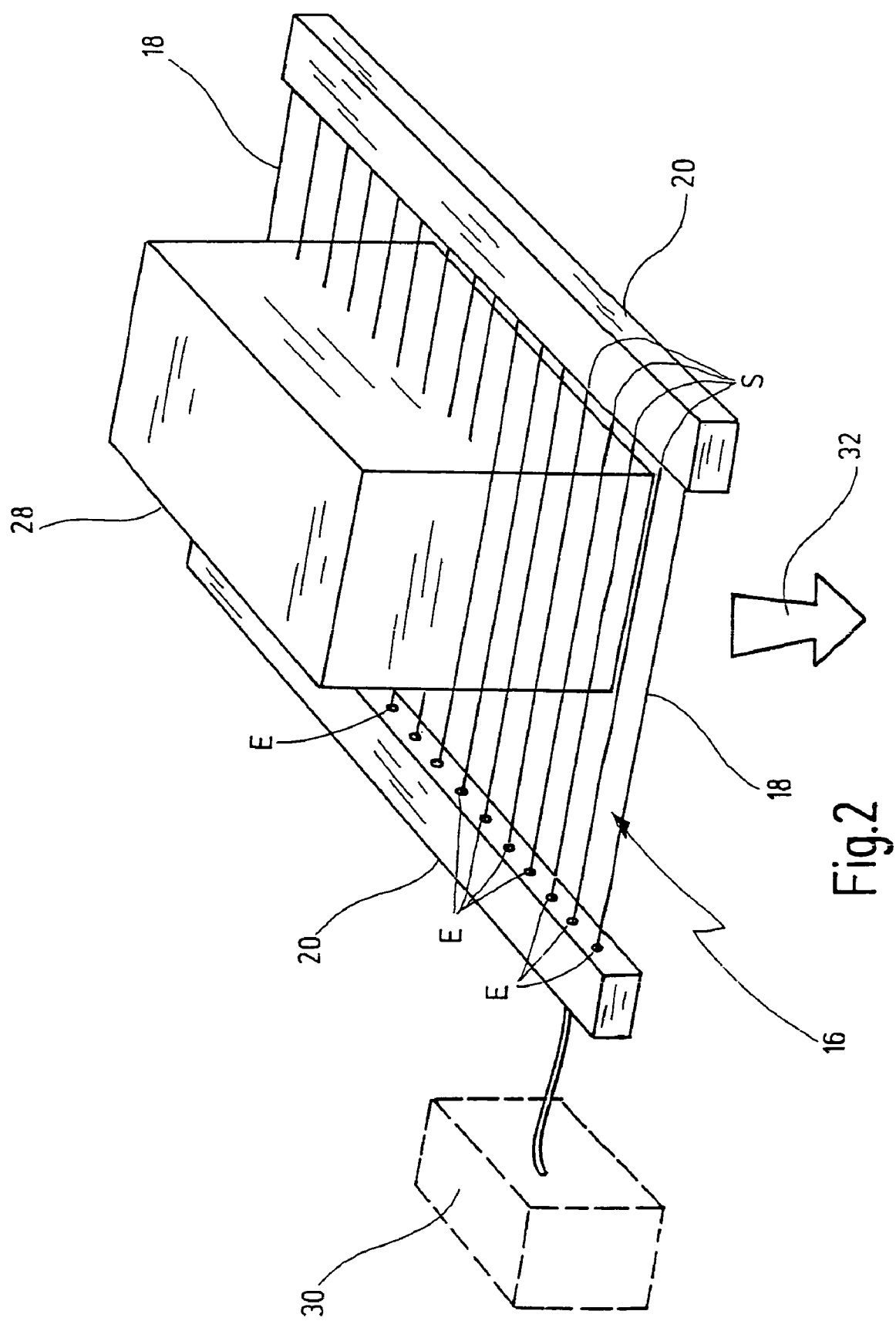
FIG. 2 shows a two-dimensional field of beams of a picking station according to the present invention, the beam field being formed by two strips of transmitters and receivers.

FIG. 2 shows an exemplary embodiment of the beam field 16, wherein the left strip 20 exclusively comprises receivers and the right strips 20 exclusively comprises transmitters. The right strip 20 is coupled to the means 30 for detecting and evaluating of interruption signals. The means 30 are not depicted in more detail. An article 28 is guided through the beam field 16 of FIG. 2 along an arrow 32.

As will be recognized clearly, the beams 18 in the area of the beam field 16, in which the article 28 is located, are interrupted. On the left strip 20 another receiver R can be recognized which does not receive any beam 18 due to the article 28 which is located within the beam path. The beam 18 of this transmitter and receiver pair is interrupted correspondingly. This interruption can be detected and evaluated by the means 30. Hence, an information on the location of the interruption is obtained. By the knowledge of the attitude of the order containers 14, which are not depicted here, relative to the beam field 16, thus the location of the interruption can be at least assigned to one of the order containers 14.

Figure 3:
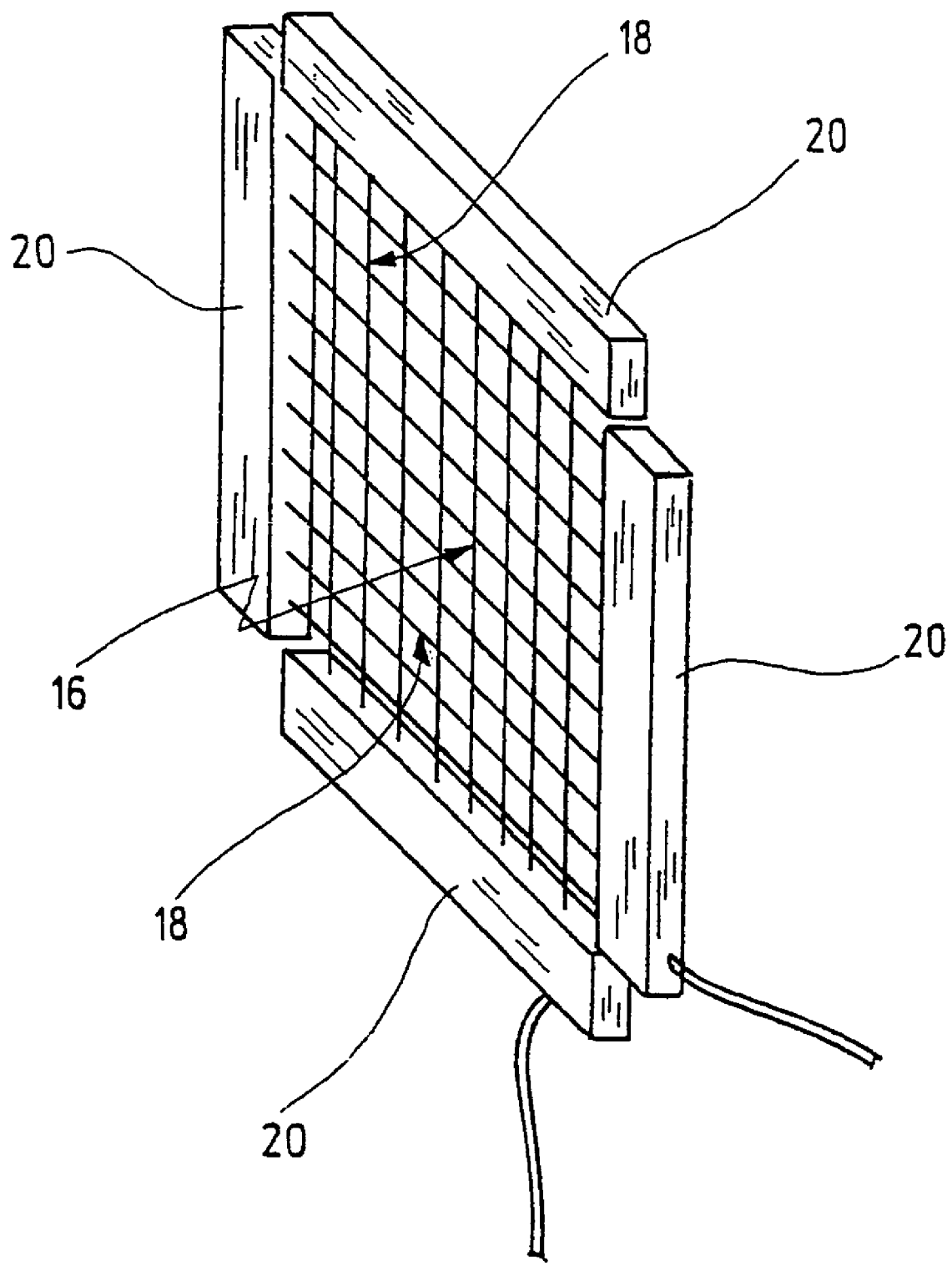
FIG. 3 shows a further beam field of a picking station according to the present invention, the beam field being formed of two pairs of strips of transmitters and receivers.

For enhancing the spatial assignment, another pair of strips 20 can, preferably, be orientated substantially orthogonal relative to the first pair of strips 20. Such an arrangement is shown in FIG. 3. If information on the third dimension, i.e. the height, is also desired to be obtained, several beam fields 16 could be arranged, one on top of the other. Such an arrangement is not shown in the figures.

Also, the manner in which the beams 18 in the beam field 16 are orientated to each other can be chosen arbitrarily.

Figure 4:
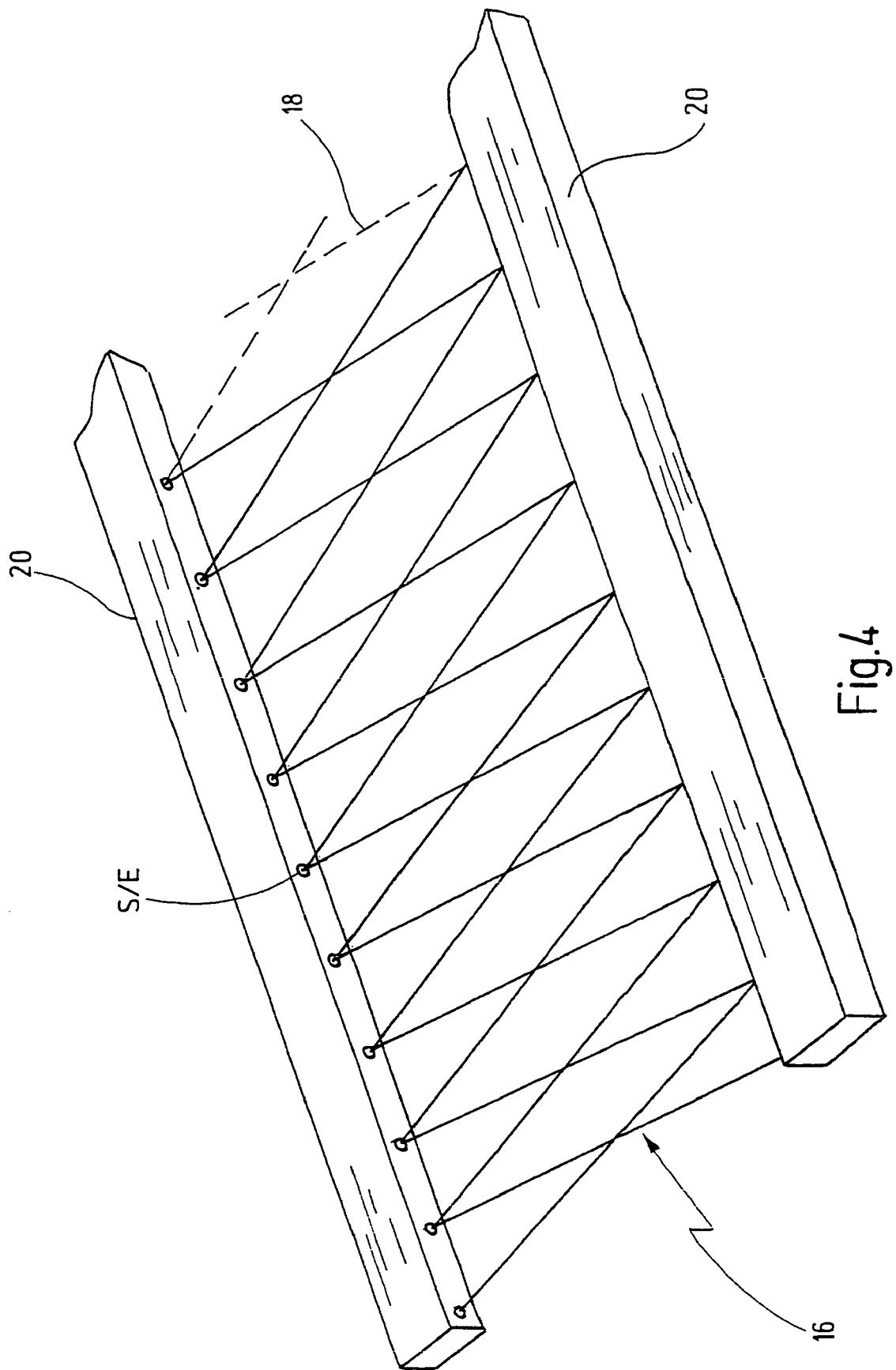
FIG. 4 shows a crossed beam field of a picking station according to the present invention.

In FIG. 4, for example, a crossed beam field 16 is depicted. In this connection, one transmitter and receiver are arranged directly adjacent to each other on the same strip.

Figure 5:
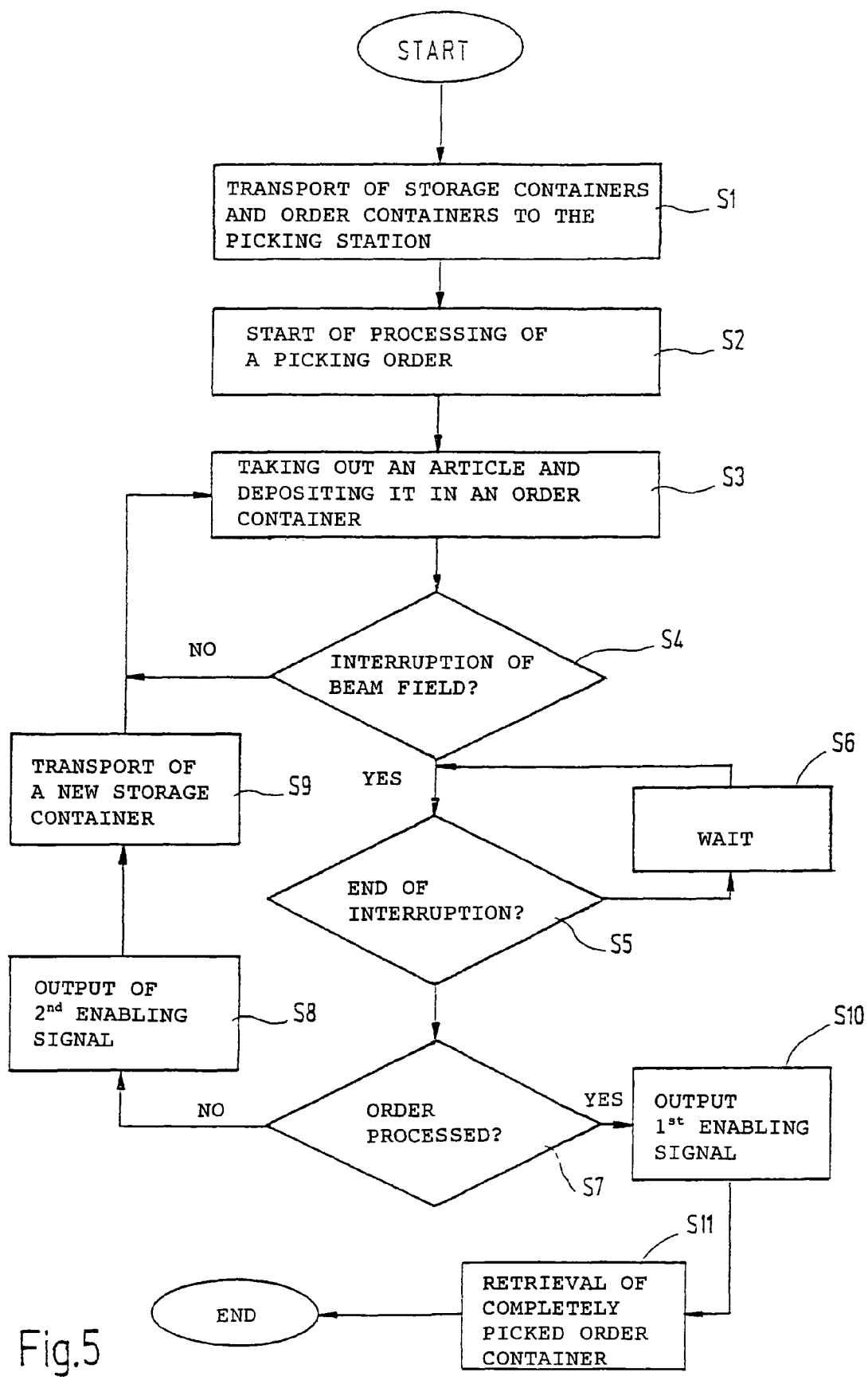
FIG. 5 shows a flow diagram of the picking method according to the present invention.

With reference to FIG. 5, the picking method according to the present invention will be described.

In a first step S1, the storage containers 26 are conveyed, for example, via the conveyor system 24, depicted in FIG. 1, to the picking station 10 according to the present invention. Empty order containers 14 are, for example, conveyed by the conveyor system 22, depicted in FIG. 1, to the buffer 12 intended for the order containers 14. A device for injection and blocking out, which is not depicted in FIG. 1, takes care that the order containers 14 are moved into and from the buffer 12, respectively.

In step S2, the processing of a picking order is started. A picking order can consist of several articles 28 to be picked.

The articles 28 can be of the same or different types. As a rule, however, the storage container 26 contain only articles 28 of the same type. If several different types of articles are to be picked for a picking order, it can be necessary that several storage containers 26 are conveyed to the picking station 10 by the conveyor system 24. Subsequently, the picking person takes out from the storage containers 26 the number of articles 28 corresponding to the picking order. For this purpose, a display can be provided in the region of the picking station 10, the display is not depicted in FIG. 1 either and indicates to the picking person how many articles 28 are to be taken from the storage container 26.

Further, the storage container 26 itself can be divided additionally such that several types of articles can be located in one and the same storage container 26. For indicating to the picking person which of the different types of articles have to be picked, optionally, an optical pointing system, which is also not depicted in FIG. 1, can be provided at the picking station 10. For this purpose, for example, a ray of light could point from above into the storage container 26 and onto a corresponding type of article. The indication of the destination, i.e. the order containers 14, is similarly, if several order containers 14 are located within the buffer 12.

In another step S3, the picking person takes the desired article 28 from the storage container 26 and puts it into the predetermined order container 14.

The type of articles, which are to be picked, itself can be divided into two categories with respect to the manner in which they are to be picked. This is, on the one hand, the so-called "droppable" category, and, on the other hand, the "non-droppable" category. "Droppable" articles can be thrown into the order containers 16 through the beam field 16 depicted in FIG. 1. "Non-droppable" articles have to be put into or deposited in the order container 14 by the picking person by hand.

However, in both instances the beam field 18 is either traversed just by an article 28 or by an article 28 in combination with at least a hand or an arm of the picking person.

In another step S4, the means 30 for detecting and evaluating, for example, request in arbitrarily selectable periodical time periods whether an interruption of the beam field 16 is present. This request, however, can also be performed by the storage management system being superordinated to the picking system and implementable by a host computer or personal computer.

If at the same time it is determined that the beam field 16 has not been interrupted, the system knows that the article 28 to be picked is not located yet within the order container 14 assigned thereto. The step S3 of taking the article 28 and putting it into the corresponding order container 14, thus is not terminated yet.

However, if the request S4 results in that the beam field 16 is interrupted, in another step S5 another request follows by which the (temporal) end of the interruption is queried.

If the request S5 results in that the beam field 16 is still interrupted, the system waits for the end of the interruption in another step S6.

If the request S5 however results in that the interruption is terminated, in another request S7 it is determined whether the picking order, which is to be carried out at the picking station 10, is completely terminated. However, this does not mean that the picking order has to be completely terminated. For example, it is also possible that the order container 14 is only picked partially at a first picking station 10 in order to be subsequently passed to another picking station 10 where the picking order can finally be picked completely.

If it is determined during the request S7 that the picking order has not been processed yet at the concrete picking station 10, thus, the means 30 can, for example, output an enabling signal in step S8.

Due to the enabling signal output in the step S8, in another step S9 a new storage container 26 is conveyed to the picking station 10, the order container 26 containing further articles 28 which belong to the picking order. Then, the picking process can be continued at the step S3.

If the request S7 however results in that the picking order (at this picking station 10) is completely processed, in another step S10 another enabling signal is output. The other enabling signal allows the order container 14 which now is completely picked, to be retrieved from the buffer 12. This is depicted by step S11 in FIG. 5. Thus, the picking process is terminated. It is clear that this process can now start from the beginning.

Therefore, what is claimed is:

1. An order-picking station for manually picking articles from storage containers into order containers by a picking person, comprising:
    an order container buffer for buffering said order containers into which said articles are to be picked, said order container buffer including several buffer spaces, arranged side-by-side, for respectively receiving one order container;
    a field of beams directly above openings of said order containers in said order container buffer for monitoring the picking of said articles and whether the order picker still has at least one of his hands in the order container into which the articles are to be picked, in order to avoid automated retrieval of the order container from said order container buffer via an order-container conveyor system; and
    a controlling device for controlling said automated conveyance of said order containers according to whether
        the order picker has at least one of his hands in the order container as indicated by interruption of the field of beams, and
        the order has been picked completely as indicated by an end of interruption of the field of beams and by a first enabling signal that indicates that the order has been processed;
    wherein, the control of said automated conveyance of said order containers from the order container buffer increases the picking efficiency of the order-picking station; and
    wherein the controller transports, to the picking station, a new storage container containing further articles that belong to the picking order in response to a second enabling signal that indicates that the order is not completely picked.

2. The order-picking station of claim 1, wherein said field of beams includes a plurality of transmitter and receiver pairs for transmitting beams and receiving said transmitted beams.

3. The order-picking station of claim 2, wherein said transmitter and receiver pairs are arranged in a strip.

4. The order-picking station of claim 3, wherein transmitters of said transmitter and receiver pairs are arranged on a first strip, and receivers of said transmitter and receiver pairs are arranged on a second strip for generating said field of beams between said first and second strips.

5. The order-picking station of claim 4, wherein said beams are parallel.

6. The order-picking station of claim 4, wherein said transmitters and receivers of said transmitter and receiver pairs are arranged alternately on one and the same strip for generating a crossed field of beams with another strip being formed equally.

7. The order-picking station of claim 1, wherein said field of beams can be coupled to means for detecting and evaluating a signal which is generated if an article to be picked, or if a part of a body of a picking person interrupts a beam of said field of beams.

8. The order-picking station of claim 7, wherein a location of said interruption is determinable by said means for detecting and evaluating, in order to assign an order container to an article which generates said signal.

9. The order-picking station of claim 1, wherein said transmitter and receiver pairs generate infrared beams.

10. The order-picking station of claim 1, wherein said transmitter and receiver pairs generate visible light.

11. The order-picking station of claim 1, wherein said field of beams is formed of at least two transmitter and receiver pairs being orthogonal to each other.

12. A method for manually picking articles from storage containers into order containers by a picking person at an order picking station, said order picking station comprising an order container buffer for buffering said order containers into which articles are to be picked, said order container buffer including several buffer spaces arranged side-by-side for respectively receiving one order container, wherein a field of beams is provided directly above openings of said order containers in said order container buffer for monitoring the picking of said articles, the method comprising:
   generating, by at least one beam transmitter, said field of beams directly above openings of order containers in said order container buffer;
   detecting, by at least one beam receiver, an interruption signal which is generated by an interruption of said field of beams by a hand of the picking person;
   halting, by an order-container conveyer system, the retrieval of said order container when said interruption signal is detected; and
   outputting, from a processor, a first enabling signal for allowing retrieval of said order container from said order container buffer via an order-container conveyor system when said interruption signal is not detected and when the order has been completely picked;
   retrieving, by the order-container conveyer system, the order container from the order container buffer in response to the first enabling signal; and
   transporting to the picking station, by a storage-container conveyer system, a new storage container containing further articles that belong to the picking order in response to a second enabling signal that indicates that the order is not completely picked.

13. The method of claim 12, wherein beams of said field of beams are also interrupted by an article to be picked.

14. The method of claim 12, wherein said first enabling signal is output if said beams are no longer interrupted.

15. The method of claim 14, wherein said first enabling signal is output if the order container is completely order-picked.

16. The method of claim 15, wherein a second enabling signal is output if said order container is not yet completely order-picked so that further articles to be picked are deliverable to said picking station.

17. An order-picking system for manually picking articles from storage containers into order containers by a picking person at an order picking station, said order picking station comprising:
   an order-container conveyor to transport order containers,
   an order container buffer for buffering said order containers into which articles are to be picked, said order container buffer including several buffer spaces arranged side-by-side for respectively receiving one order container;
   a field of beams directly above openings of order-containers in said order container buffer for monitoring the picking of said articles and whether the order picker still has at least one of his hands within the order container into which the articles are to be picked, in order to avoid automated retrieval of said order container from said order container buffer via an order-container conveyor system; and
   a controlling device for controlling said automated conveyance of said order containers according to whether
      the order picker has at least one of his hands in the order container as indicated by interruption of the field of beams, and
      the order has been completely picked as indicated by an end of interruption of the field of beams and by a first enabling signal that indicates that the order has been processed;
   wherein, the control of the automated retrieval of the order container from the order container buffer increases the picking efficiency of the order-picking system; and
   wherein the controller transports, to the picking station, a new storage container containing further articles that belong to the picking order in response to a second enabling signal that indicates that the order is not completely picked.

18. The order-picking station of claim 1, wherein the controller prevents automated retrieval of the order container from the order container buffer until receipt of a first enabling signal indicating that the order has been completely picked and that the beam field is not interrupted by at least one hand of the order picker.

* * * * *